W. H. AXFORD.
HOISTING GEAR FOR SLAUGHTERING CATTLE.
No. 191,091. Patented May 22, 1877.
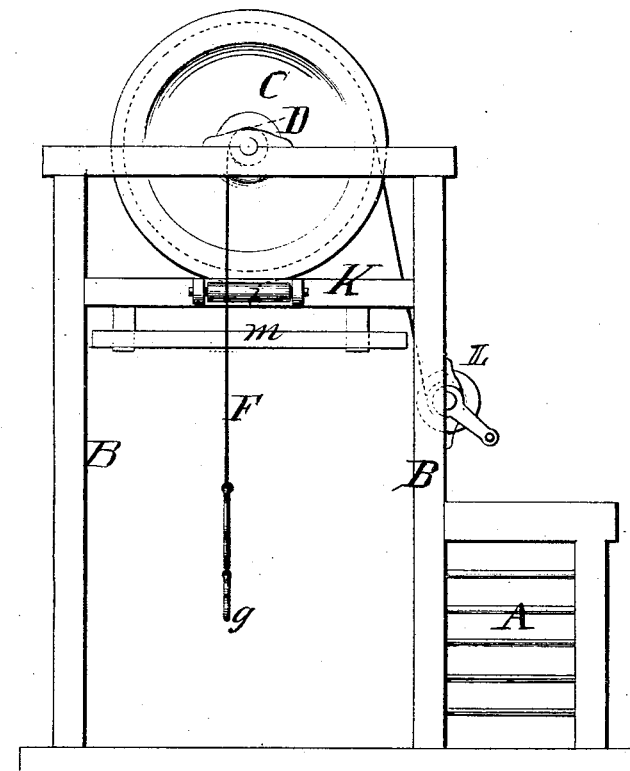
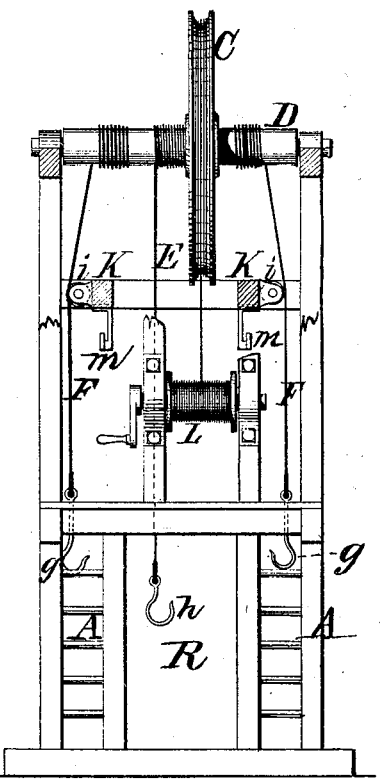
Witnesses.
Fred Haynes
L. Allen
Inventor.
William H. Axford
by his Attorneys
Brown & Allen

UNITED STATES PATENT OFFICE.

WILLIAM H. AXFORD, OF JERSEY CITY, NEW JERSEY.

IMPROVEMENT IN HOISTING-GEARS FOR SLAUGHTERING CATTLE.

Specification forming part of Letters Patent No. 191,091, dated May 22, 1877; application filed March 2, 1877.

*To all whom it may concern:*

Be it known that I, WILLIAM H. AXFORD, of Jersey City, in the county of Hudson and State of New Jersey, have invented an Improvement in Hoisting-Gear for Slaughtering Cattle; and I do hereby declare that the following is a full, clear, and exact description of the same, reference being had to the accompanying drawing, forming part of this specification.

My invention has for its object to supply means whereby cattle to be slaughtered may be seized by the hind leg, hoisted, and held head downward while they are slain, to facilitate bleeding, and then, when dead, after lowering the animals so killed for partial dressing, to seize them by hooks inserted under the cords above the gambrel-joints, and, while hoisting them again for skinning, dressing, and halving, to spread their hinder legs in the most convenient manner for the performance of the operations named.

The invention consists in the combination, with a wheel and axle supported in a suitable frame provided with separating-rollers, of three ropes, winding upon said axle, the middle rope being provided with a hook for seizing the live animal by the hind leg, as hereinafter described, and the outer ropes being provided with hooks for supporting the dead animal for skinning, gutting, and halving, and being so arranged on said axle that during the hoisting the hinder legs of the animal hooked thereto are spread apart to facilitate said operations.

Figure 1 in the drawing is a side view of the invention; and Fig. 2 is a front view of the same, a portion of the upper front part of the frame being shown broken away to exhibit the arrangement of parts of the apparatus.

A represents a portion of the pen or inclosure into which the cattle are driven for slaughtering, said pen having an opening or passage, R, through which the cattle are taken to the hoisting-gear, as hereinafter described.

Placed in proper relation with said pen A is a frame, B, supporting the hoisting-gear.

This hoisting-gear consists partly of a wheel and axle, C D, the wheel C being placed between the ropes F F, on one side of the middle of the axle D, to permit the winding upon the middle part of said axle of the rope E, having attached to its lower end the hook $h$.

At about equal distances from the ends of said axle are wound upon said axle the ropes F, so arranged on said axle that when wound thereon the coils of the rope upon said axle shall successively approach the extremities of the axle when the said ropes F are wound thereon, as hereinafter described. Said ropes F are provided at their lower ends with hooks $g$, and they also run over friction and separating rollers $i$, attached to the beams K of the frame B.

The wheel and axle C D are turned by a rope wound on the wheel C and the windlass L.

To the lower parts of the beams K are attached rails $m$, upon which hook rollers are placed for use, as hereinafter described.

The operation of the invention is as follows: The animal to be slaughtered is caught by the hind leg with the hook $h$, which is passed around the leg just above the gambrel-joint, the hook being of such size that it cannot slip over said joint. The turning of the windlass L winds the rope E on the axle D, draws the animal backward through the passage R out of the pen A, and lifts the hinder parts of said animal to the proper position for killing. The throat of the animal is then cut, its position being such as to favor the rapid and complete flow of blood.

As soon as the animal is dead and the blood has ceased to flow, the carcass is lowered to the floor, when the hind legs are unhooked and the operations of skinning and ripping are begun. The hooks $g$ are then inserted under the cords of the hind legs of the carcass, above the gambrel-joints, and the carcass is rehoisted for the completion of the dressing operations. While rehoisting, the hind legs are spread apart by the action of the apparatus, to facilitate the operations of skinning, gutting, and halving. When the halving is completed, the halves are respectively suspended under the rails $i$, by their respective ropes and hooks, from which they are transferred to the hook-rollers running on said rails and rolled out of the way to make room for another animal to be slaughtered.

In this way, by the use of the three hoisting ropes and hooks on one shaft, arranged in relation therewith as described, the operations of slaughtering, dressing, and halving are much facilitated, and a saving of both time and labor is effected, and great economy of space occupied by the apparatus is secured.

I claim—

The slaughtering apparatus consisting of the hoisting and spreading ropes F F, provided with hooks g, the spreading-rollers i, the wheel and axle C and D, and the suspending-rope E, having the hook h, said wheel and suspending-rope being arranged on the one axle between the said spreading-ropes, substantially as and for the purpose specified.

WILLIAM H. AXFORD.

Witnesses:
 A. ONSLOW,
 CHAS. BOLTWOOD.